US008719919B2

(12) United States Patent
Rice et al.

(10) Patent No.: US 8,719,919 B2
(45) Date of Patent: *May 6, 2014

(54) SERVICE MEDIATION FRAMEWORK

(75) Inventors: Joseph Allen Rice, Ballston Lake, NY (US); Brandon Matthew Castagna, Mount Holly, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,145

(22) Filed: Jul. 12, 2011

(65) Prior Publication Data

US 2013/0019282 A1    Jan. 17, 2013

(51) Int. Cl.
*G06F 9/00*    (2006.01)

(52) U.S. Cl.
USPC .................................. 726/15; 726/1; 726/4

(58) Field of Classification Search
USPC .................... 726/1–2, 4–5, 15; 709/223, 225
See application file for complete search history.

(56) References Cited

U.S. PATENT DOCUMENTS

| | | | |
|---|---|---|---|
| 7,418,457 B2 | 8/2008 | Kaler et al. |
| 7,451,157 B2 | 11/2008 | Kaler et al. |
| 7,721,322 B2 | 5/2010 | Sastry et al. |
| 7,930,214 B2 | 4/2011 | Knauerhase et al. |
| 7,957,994 B2 | 6/2011 | Brown et al. |
| 7,979,379 B2 | 7/2011 | Voegele et al. |
| 7,979,554 B2 | 7/2011 | Ho et al. |
| 7,984,096 B2 | 7/2011 | Beoughter et al. |
| 8,020,051 B2 | 9/2011 | Ziegler |
| 8,041,760 B2 | 10/2011 | Mamou et al. |
| 8,051,430 B2 | 11/2011 | Rapp |
| 8,060,553 B2 | 11/2011 | Mamou et al. |
| 8,069,057 B2 | 11/2011 | Choubey et al. |
| 8,090,831 B2 | 1/2012 | Brauel et al. |
| 8,135,785 B2 | 3/2012 | Malladi et al. |
| 8,140,582 B2 | 3/2012 | Chen et al. |
| 8,140,615 B2 | 3/2012 | Miller et al. |
| 8,141,151 B2 | 3/2012 | Hunt et al. |
| 8,146,099 B2 | 3/2012 | Tkatch et al. |

(Continued)

FOREIGN PATENT DOCUMENTS

WO    2012073027 A2    6/2012

OTHER PUBLICATIONS

Giordano, DNS-Based Discovery System in Service Oriented Programming, Advances in Grid Computing—EGC 2005, pp. 840-850, Springer-Verlag Berlin Heidelberg.

(Continued)

*Primary Examiner* — Samson Lemma
(74) *Attorney, Agent, or Firm* — Banner & Witcoff, Ltd.; Michael A. Springs

(57) ABSTRACT

A service mediation framework may allow each component within a computer network to perform common service processing tasks driven by standardized service policies stored within a centralized repository. In particular, an enhanced service domain name system (DNS) server, an enhanced service router, and/or an enhanced service gateway within the network may each access relevant service policies stored within an enhanced service repository to implement tasks such as security, content-based routing, logging, message format translation, and protocol bridging for each service request processed by the network. In addition, each network component may communicate through standardized formats, such as Extensible Markup Language (XML), to realize the end-to-end network solution.

19 Claims, 4 Drawing Sheets

(56) References Cited

U.S. PATENT DOCUMENTS

| | | | |
|---|---|---|---|
| 8,156,140 | B2 | 4/2012 | Roshen et al. |
| 8,156,179 | B2 | 4/2012 | Parmar et al. |
| 8,161,500 | B2 | 4/2012 | Tan et al. |
| 8,183,994 | B2 | 5/2012 | Staab |
| 8,195,803 | B2 | 6/2012 | Zhang et al. |
| 8,196,145 | B2 | 6/2012 | Miller et al. |
| 2001/0011250 | A1 | 8/2001 | Paltenghe et al. |
| 2002/0188513 | A1 | 12/2002 | Gil et al. |
| 2003/0074367 | A1 | 4/2003 | Kaler et al. |
| 2004/0236633 | A1 | 11/2004 | Knauerhase et al. |
| 2005/0177602 | A1 | 8/2005 | Kaler et al. |
| 2006/0020646 | A1 | 1/2006 | Tee et al. |
| 2006/0041669 | A1 | 2/2006 | Bemmel et al. |
| 2006/0123472 | A1 | 6/2006 | Schmidt et al. |
| 2006/0282660 | A1 | 12/2006 | Varghese et al. |
| 2007/0118878 | A1 | 5/2007 | Sastry et al. |
| 2008/0046335 | A1 | 2/2008 | Zhou |
| 2008/0313648 | A1* | 12/2008 | Wang et al. .................... 719/315 |
| 2009/0070478 | A1* | 3/2009 | Herman et al. ............... 709/231 |
| 2010/0023491 | A1 | 1/2010 | Huang et al. |
| 2011/0231921 | A1 | 9/2011 | Narayanan et al. |
| 2011/0264865 | A1 | 10/2011 | Mobarak et al. |
| 2012/0110199 | A1 | 5/2012 | Mao et al. |

OTHER PUBLICATIONS

Callaway, AN Autonomic Service Delivery Platform for Service-Oriented Network Environments, Nov. 7, 2007, pp. 1-70, PHD Preliminary Examination, Department of Electrical and Computer Engineering, North Carolina State University.

ISR & WO mailed Sep. 27, 2012 from PCT Application PCT/US12/45164.

Ludwig et al., "Catalog-based service request management", IMB Systems Journal, vol. 46, N. 3, Dec. 2007 (retrieved on Sep. 4, 2012), Retrieved from the internet http://citeseerx.ist.psu.edu.

Office Action mailed Nov. 1, 2012 for U.S. Appl. No. 13/181,151.

Office Action dated Feb. 21, 2013 from U.S. Appl. No. 13/181,141.

Notice of Allowance dated Mar. 1, 2013 from U.S. Appl. No. 13/181,151.

Office Action dated Jun. 13, 2013 from U.S. Appl. No. 13/181,141.

International Search Report dated Aug. 28, 2013 in International Application No. PCT/US2013/046749.

* cited by examiner

SERVICE MEDIATION FRAMEWORK

CROSS REFERENCE TO RELATED APPLICATIONS

This application is related to U.S. application Ser. No. 13/181,141 and U.S. application Ser. No. 13/181,151, which were filed concurrently with this application and which are herein incorporated by reference in their entirety.

TECHNICAL FIELD

Aspects of the invention generally relate to various modules and service policies that may be used to handle service requests within a network. In particular, each component of the network may perform common service processing tasks driven by standardized service policies that may be managed in a centralized repository.

BACKGROUND

The Internet provides ubiquitous connectivity that is quick, open, and enables clear communication and exchange of ideas. Unfortunately, the Internet is not secure enough for many confidential, proprietary exchanges that occur within private networks such as those maintained by corporations, schools, governmental agencies, and the like.

A private network (e.g., a corporate network) utilizes encryption to create a protected network that is secure. However, a private network is not open enough and instead creates barriers to agility. In particular, services within a private network are routed and accessed by point-to-point connections that are customized for each service. When changes need to be made to how services are provisioned and/or when new services need to be offered, there is no central place to advertise or manage access to the changes and/or new services. There is also no consistent way to connect users to each service in a secure, reliable and easy-to-provision way.

Today, in large corporations, there are tens of thousands of servers that function as hard-wired and hand-configured components. Under this scenario, it is very difficult to connect together a system that provides adequate speed, security, agility, and extensibility. In particular, this network configuration makes organizing cross-connectivity and integration across groups of people in a corporation challenging.

Moreover, network processes in private networks are implemented manually and in an ad-hoc way using information technology (IT) systems for performing steps such as defining, designing, procuring, building, developing, testing, promoting, certifying, and launching physical servers, network connectivity, and/or security capabilities. To implement these processes, conventional networks within an organization such as a corporation include tightly coupled layers of network components, manual configurations, and/or embedded code.

Increasingly, businesses need the ability to deploy IT systems in a fast, robust, secure, and extensible way. Moreover, services within and across business domains need to be connected in a governed and agile way.

Therefore, there is a need for a network implementation that would allow network components within a private network (e.g., corporate network, and the like) to have the same ease of connectivity as the Internet but also allow the ability to enforce policies and security as in a private network

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, non-transitory computer readable media, and apparatuses for implementing common tasks such as security, content-based routing, logging, message format translation, and protocol bridging within a private network. This scheme may be implemented by configuring network components to perform these common service processing tasks driven by standardized service policies that may be managed within a centralized repository.

Other aspects of the disclosure relate to an enhanced service DNS server which may resolve service uniform resource locators (URLs) into service addresses, an enhanced service router that is configured to interpret the services being called and to route the requests in a way that delivers the best quality of service, an enhanced service repository that may serve as a secure, central, easy-to-use storage device to discover and publish new services or content within a private network, and an enhanced service gateway that may aid in deploying and registering services.

Yet other aspects of the disclosure relate to a service mediation framework that allows network devices within a network to communicate with one another in a standardized format and handle service requests.

Aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, there is a need for entities to deliver services and/or products better, faster, and cheaper in a way that allows for high availability, maximizing flexibility, and improving speed to market. The islands of infrastructure common in today's network systems need to be changed into networks that deliver composite services across business domain boundaries.

Figure 1:
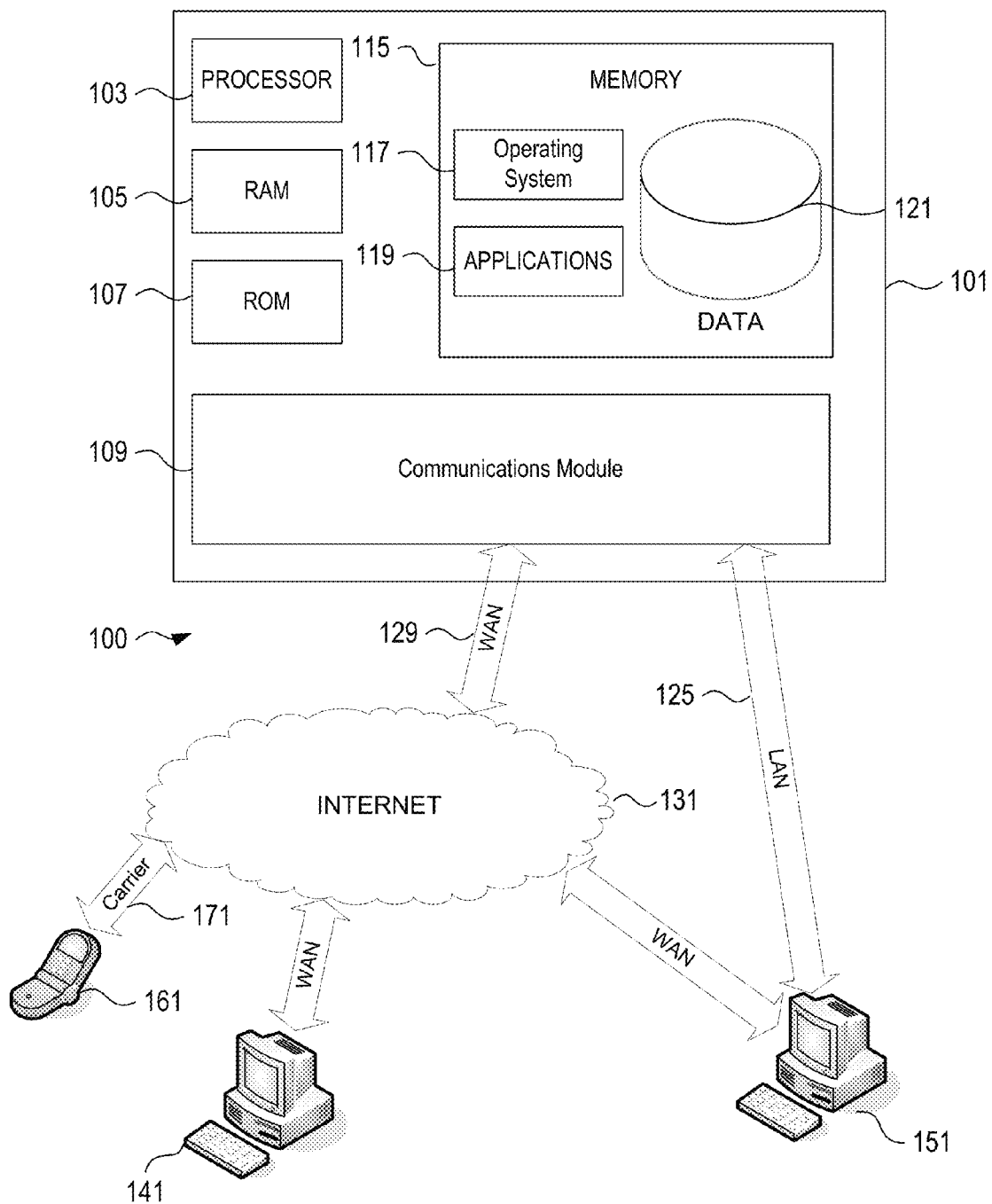
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include an enhanced network services device 101 wherein the processes discussed herein may be implemented. The enhanced network services device 101 may have a processor 103 for controlling overall operation of the enhanced network services device 101 and its associated components, including random-access memory (RAM) 105, read-only memory (ROM) 107, communications module 109, and memory 115. Processor 103 and its associated components may allow the enhanced network services device 101 to run a series of computer-readable instructions related to providing common service functions such as security, routing, and logging of messages. Processor 103 may also direct enhanced network services device 101 to perform tasks such as logging, message format translation, and protocol bridging within a private network.

Enhanced network services device 101 typically includes a variety of computer readable media. Computer readable media may be any available media that may be accessed by enhanced network services device 101 and include both volatile and nonvolatile media, removable and non-removable media. By way of example, and not limitation, computer-readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by enhanced network services device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, data, and the like to digital files.

Although not shown, RAM 105 may include one or more applications representing the application data stored in RAM 105 while the enhanced network services device 101 is on and corresponding software applications (e.g., software tasks) are running on the enhanced network services device 101.

Communications module 109 may include a microphone, keypad, touch screen, and/or stylus through which a user of enhanced network services device 101 may provide input, and may also include one or more of a speaker for providing audio output and a video display device for providing textual, audiovisual and/or graphical output.

Software may be stored within memory 115 and/or storage to provide instructions to processor 103 for enabling enhanced network services device 101 to perform various functions. For example, memory 115 may store software used by the enhanced network services device 101, such as an operating system 117, application programs 119, and an associated database 121. Also, some or all of the computer executable instructions for enhanced network services device 101 may be embodied in hardware or firmware.

Enhanced network services device 101 may operate in a networked environment supporting connections to one or more remote computing devices, such as computing devices 141, 151, and 161. The computing devices 141, 151, and 161 may be personal computing devices or servers that include many or all of the elements described above relative to the enhanced network services device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, enhanced network services device 101 may be connected to the LAN 125 through a network interface or adapter in the communications module 109. When used in a WAN networking environment, the enhanced network services device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

Additionally, one or more application programs 119 used by the enhanced network services device 101, according to an illustrative embodiment, may include computer executable instructions for invoking functionality related to communication including, for example, email, short message service (SMS), and voice input and speech recognition applications (e.g., for transmitting service request information and/or receiving service responses, and the like). In addition, the application programs 119 may include computer executable instructions for invoking user functionality related to accessing a centralized repository for performing various service tasks like routing, logging, and protocol bridging.

Embodiments of the disclosure may include forms of computer-readable media. Computer-readable media include any available media that can be accessed by an enhanced network services device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor 103 on enhanced network services device 101. Such a processor may execute computer-executable instructions stored on a computer-readable medium.

Figure 2:
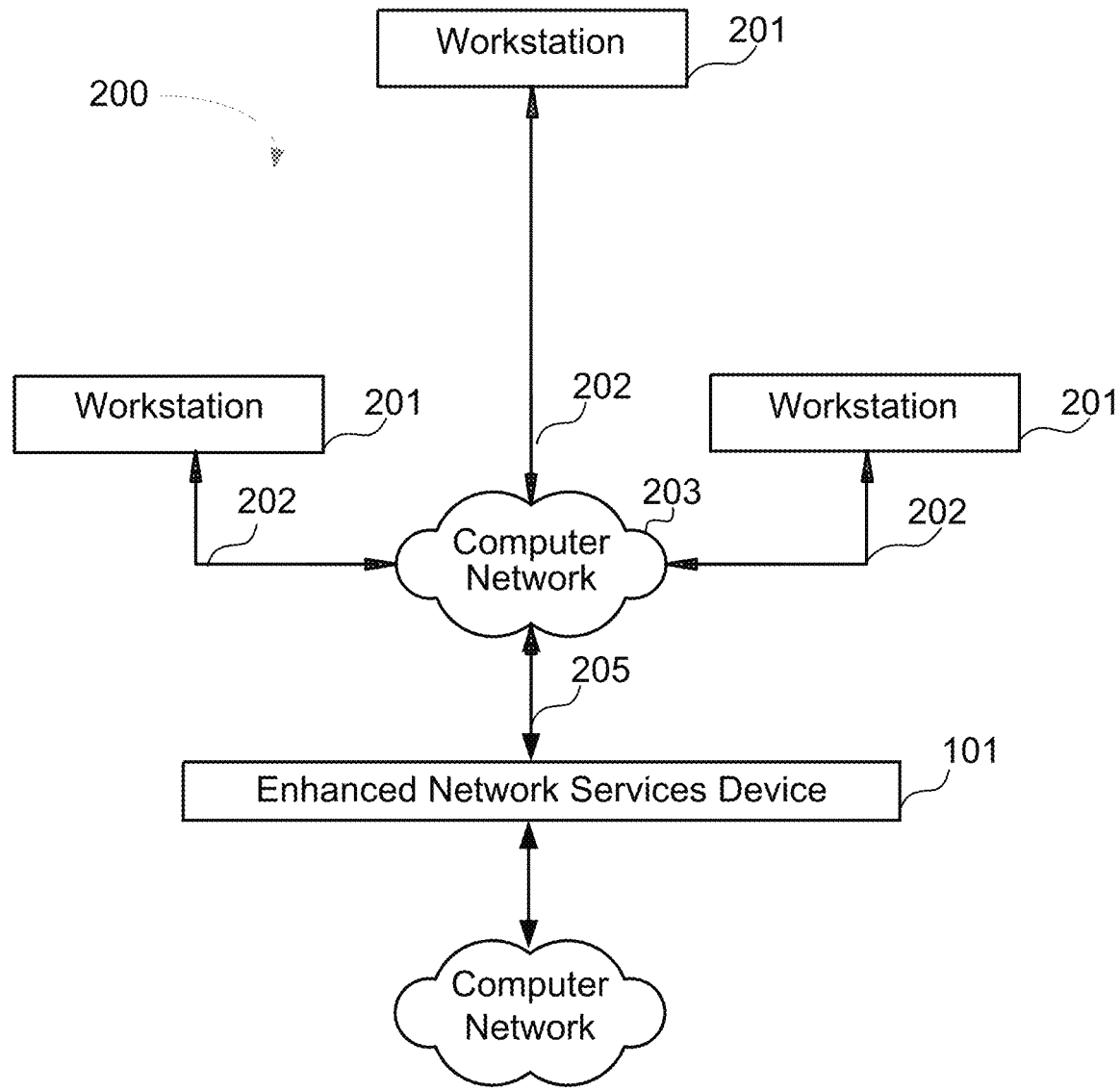
FIG. 2 is an illustrative block diagram of workstations and servers that may be used to implement the processes and functions of one or more aspects of the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to enhanced network services device 101. Workstations 201 may include many of the same hardware/software components as enhanced network services device 101. In some embodiments, workstations 201 may represent data stores for storing service policy data and metadata used by enhanced network services device 101. In other embodiments, workstations 201 may represent various types of enhanced network services devices 101 within network 200, including an enhanced service DNS server, enhanced service router, enhanced service repository, and/or an enhanced service gateway. In system 200, enhanced network services device 101 may be any suitable server, processor, computer, or data processing device, or combination of the same. Enhanced network services device 101 may be used to process the instructions received from one or more users or one or more other devices (e.g., workstations 201).

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and enhanced network services device 101, such as network links, dial-up links, wireless links, hard-wired links, and the like.

The steps that follow in the Figures may be implemented by one or more of the components in FIGS. 1 and 2 and/or other components, including other computing devices.

In accordance with various aspects of the disclosure, methods, computer-readable media, and apparatuses are disclosed that allow an entity, such as a company, government agency, university, and the like, to implement advanced methodologies for the creation of a framework that may allow network components to receive service policy information in a standardized format from a centralized repository. In general, within the framework, the content of various messages transported within the network may drive the integration of the network components. The data within a message may be used to describe how a message may need to be processed by any one of the network components. The framework may define common functions such that any vendor or technology implementation within the network will be the same. The framework may facilitate standard network tasks such as routing, authentication, authorization, auditing, and transformations. These tasks may be executed dynamically based on the content of the message.

As used herein, a service request may relate to a variety of services provided by the network maintained by an organization. For instance, if the organization is a bank, the network maintained by the bank may provide services such as opening a bank account, registering for a credit card, and/or applying for a loan.

Each network component within the service framework may possess enhanced features that allow the component to access a datastore of detailed service policy metadata and data and implement service functions based on the service policy metadata/data. For instance, when the enhanced network services device 101 is an enhanced service router and/or an enhanced service DNS server, the device 101 may access routing policy information to determine a service address of a service provider and/or service routing policy information to transmit the service request to a preferred service provider of the requested service. In addition, when the enhanced network services device 101 is an enhanced service gateway, the device 101 may access and implement other types of service policy information, such as those related to security (e.g., authentication and/or authorization), protocol bridging, and format translation. Moreover, when the enhanced network services device 101 is a service repository, the device 101 may store and/or export service policy data/metadata in a common format (e.g., based on a standard) and may include information on all of the common service policies commonly used within a private network.

Figure 3:
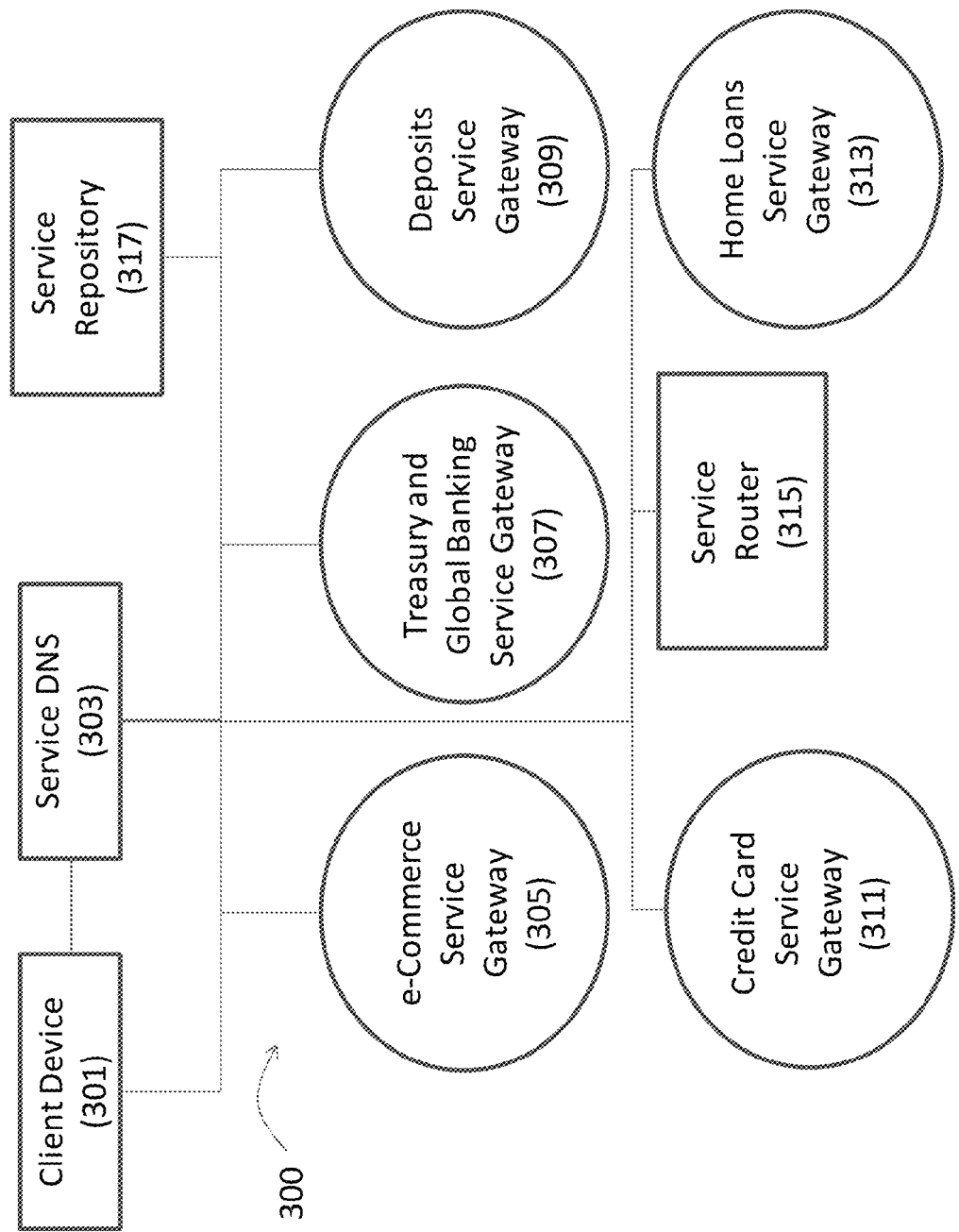
FIG. 3 shows an example network within an organization such as a bank that includes various service mediation framework devices for handling data communicated within the network, in accordance with at least one aspect of the disclosure.

FIG. 3 shows an example network 300 within an organization such as a bank that includes various service mediation framework devices for handling data communicated within the network 300, in accordance with certain aspects of the disclosure. Various departments with the bank may communicate over network 300 and each department may have its own enhanced service gateway. For example, FIG. 3 shows an enhanced service gateway for an e-Commerce department 305, treasury and global banking department 307, deposits department 309, credit card department 311, and home loans department 313. One of ordinary skill in the art would recognize that each of the service gateways 305-313 may in fact be a cluster of service gateways 305-313 located within each bank department.

In the network 300, a client device 301 (e.g., user terminal, network server, and the like) within the bank may request a service in a variety of ways, including by a user inputting a service uniform resource locator (URL) into a browser running on device 301 and/or through a message transmitted from the client device 301. In some embodiments, client device 301 may actually represent multiple client devices 301. When a user of client device 301 initiates a web service by inputting a service URL into a browser, the service request may be transmitted to an enhanced DNS server 303, and the enhanced service DNS server 303 may resolve the service URL (e.g., the URL of a service provider) into a service address of a service provider for the service URL. For example, a service URL for accessing sports content may be "sports," meaning that a user may access a preferred service provider for sports content within a private network by typing in the word "sports" into a browser. Similarly, the service URL for accessing the latest news content may be "news," and the service URL for accessing the latest weather information may be "weather." One of ordinary skill in the art would recognize that alternative naming conventions may be used to designate a service URL.

In general, a service request may represent a higher order construct that specifies a desired resource. For instance, if a user initiates a service request for "sports," the enhanced service DNS server 303 may access policy definition metadata stored on an enhanced service repository 317 that specifies a particular sports content provider. If the same user initiates this service request at a later date, the policy definition metadata for this service request may have changed during the interim; if so, the enhanced service DNS server 303 may access policy definition metadata that specifies that the service request for "sports" should be routed to a different sports content provider.

Other types of service requests may not involve a user-web service interaction; these service requests may be communicated directly between different network components. These server-server service interactions may involve various network resources (e.g., enhanced service gateways 305-313, enhanced service router 315, and the like) and may request that a service provider (e.g., one of the servers within the network) perform various network service tasks (e.g., authentication, logging, format translation, and the like) for a service requestor server. Similar to the user-web service interaction described in the previous paragraph, the service requestor (e.g., enhanced service router 315, enhanced service gateways 305-313, and the like) may access relevant service policy information stored in enhanced service repository 317 to perform the requested service. Also, as before, the service requestor may access and implement a service task that is consistent with the latest version of the service policy information stored in enhanced service repository 317.

In general, when the service request is a web-based browser interaction, the request may first be routed to an enhanced service DNS server 303 within the bank network 300, which may access routing policy metadata and data for the service request from the enhanced service repository 317. In some aspects, the enhanced service repository 317 may export a file including the routing policy information in Extensible Markup Language (XML) format to the enhanced service DNS server 303. Once the enhanced service DNS server 303 obtains the routing information (e.g., a destination service address), server 303 may route the service request to an appropriate enhanced service gateway 305-313 that may handle the service request.

For server-server service interactions, when a client device 301 requests a service, the service request may not be first routed to the enhanced service DNS server 303. Instead, these service requests may be routed directly to an enhanced service router 315 and/or enhanced service gateways 305-313 (discussed further below). For instance, the service router 315 may aid in routing a service request to a predetermined queue for any message-oriented middleware.

In the process of routing the service request to one or more enhanced service gateways 305-313, the service request may also be routed to enhanced service router 315, which may also aid in routing the service request to an appropriate destination (e.g., across firewalls, and the like). In conventional systems, to access a service, a user must select a conventional URL on a web browser to call a web page. When the URL is selected, the user is connected to a single backend system (e.g., the service provider server) based on the URL. The enhanced service router 315, on the other hand, may allow a client device 301 to request a service using content-based routing. With this approach, instead of always using the same route to connect to a service provider or instead of using the same service provider to handle a given type of service request, the enhanced service router 315 may access routing policy metadata and data in enhanced service repository 317 to dynamically determine the best possible route and/or the best possible service provider for a given service request at the time that the service request is made. For instance, one service provider may be better than another service provider because of lower cost associated with providing the service.

Each of the enhanced service gateways 305-313 and the enhanced service router 315 may access metadata and data stored in enhanced service repository 317 to determine relevant policies that may need to be enforced on the service request. In some aspects, each of the components 301-317 within network 300 may be appliances configured to receive/transmit data from/to any other component 301-317 in XML format, among other formats. In addition, each appliance may be configured to employ Extensible Stylesheet Language Transformations (XSLT) to allow one appliance to communicate with another appliance in a standard format.

Once the service request is routed to the appropriate destination (e.g., one of the enhanced service gateways 305-313), one of the enhanced service gateways 305-313 may transmit an appropriate response back to client device 301. Once again, in order to route the response to the service request back to client device 301, one of the enhanced service gateways 305-313 may access routing policy information from service repository 317.

In some aspects, the information stored within the enhanced service repository 317 may be updated periodically when the need arises. For instance, when a new service comes online within one of the departments within the bank, a set of policies governing that service may be added to enhanced service repository 317. Similarly, information within the enhanced service repository 317 may be updated when a service needs to be routed differently (e.g., because an older service URL has now become inactivated, and the like). In this way, the implementation of service policies may be automated and data-driven rather than driven through manual intervention.

The enhanced service gateways 305-313 may be configured to control a variety of service policies. Just as the enhanced service DNS server 303 and the enhanced service router 315 may access and implement routing policies by accessing policy metadata and data from the enhanced service repository 317, the enhanced service gateways 305-313 may access and implement other service policies stored in enhanced service repository 317, as outlined below.

The enhanced service repository 317 may store data related to operational (e.g., run-time) policies such as those relating to entitlement, routing, work load management, logging, protocol bridging, format translation, filtering, and/or business process management, among other things, for use/access by the enhanced service DNS server 303, enhanced service gateways 305-313, and/or enhanced service router 315. Policies related to entitlement may include details on security functions such as authentication (e.g., establishing identity through a credential), authorization (e.g., determining if access is authorized for a privileged resource), and auditing of services and/or service requests. Policies related to routing may define how to decide where to route a given service request or a response to a service request (e.g., DNS/QUEUE resolution, site selection, content or context based routing, and the like).

The service mediation framework may employ a sophisticated and dynamic means of routing a message which is ultimately decoupled from the mediation logic. For a given service, there may be distinct data-types which may be marshaled from consumer to one or more providers. For any given service, there may be a single canonical data type on which the service may route the message. Across multiple services, there may be multiple canonicals which may be employed to facilitate normalization of data from service consumer to service provider. To maximize reuse, common routing implementations (or strategies) may need to be defined which work across all services with varying canonical data-types. Furthermore, different routing strategies may utilize varied logical parameters depending on the business requirement.

To facilitate dynamic content-based routing across this diverse system, each routing strategy may contain a capability to support multiple data formats. In this implementation, the service may contain a reference to a strategy. After mediating to the service canonical, the service mediation framework may pass the underlying canonical message to the strategy. Based on the type of message, the routing strategy may contain metadata for extracting logical routing fields from the specific payload content based on the data-type. Once the varied routing formats are normalized through the logical routing field extraction process, the routing strategy may execute the business logic to determine the service provider to which the message needs to be routed.

For instance, an example of context-based routing or decisioning, triggered by a run-time context, includes cost/performance-based routing (based on comparative costs per transaction and availability to lower-cost cloud computing versus higher cost and more resilient internal services on an entity controlled network). In this example, a service request may be routed in network 300 based on the lowest cost provider that meets the minimum availability and performance service level agreements (SLAs) for each request type. Another example of context-based routing or decisioning, triggered by a run-time context, includes value-based service level management, where the business value (transaction amount or business impact of failure) for each transaction type (or service request type) may be coded as metadata in enhanced service repository 317 and is used to determine which transactions (or requests) may be guaranteed processing and which may be throttled or redirected when resources become constrained or demand exceeds rated capacity. Yet another example of context-based routing or decisioning, triggered by a run-time context, includes resource-based timing, where the amount of resources (e.g., threads, memory, connections, time-out values, and the like) may be allocated based on granular measurements of available resources by provider and service type. A final example of context-based routing or decisioning, triggered by a run-time context may include the use of alternate path triggers. In this example, when virtual machine work-load management is configured, a service gateway 305-313 may determine that only some traffic may be served using dynamic content (from the active service provider virtual machine instances). Service gateways 305-313 may then route excess traffic to alternate internal service providers or adjust cache parameters in the message response header to trigger service of some requests via cached content that is still relevant but aged to a greater degree until demand subsides or additional dynamic service providers become available or more responsive.

In general, the ability of an enhanced service repository 317 to define significant triggers (driven by environment or run-time context) and to render resultant actions in a common way (e.g., XML) which may be acted upon by a diverse set of vendor tools throughout the network or even across multiple divisional or corporate boundaries may represent a breakthrough extension of federated connectivity and service management.

Policies related to work-load management may include information on how many and which network components may participate in responding to a service request (connection distribution, local load balancing, Virtual Machine (VM) level workload management (WLM), and the like). Policies related to logging may include information on when to log data (e.g., when a service request is made to measure performance metrics of the network such as the amount of time that the network takes to fulfill the service request, when access to a privileged network resource is granted or denied, when fraud is committed on the network, and the like)

Policies related to protocol bridging may include information on how to change data from one format (e.g., Simple Mail Transfer Protocol (SMTP), Hypertext Transfer Protocol (HTTP), File Transfer Protocol (FTP), and the like) to another format (e.g., to allow one application to communicate with another). Policies related to format translation may include information related to editing data to make the data suitable for use in a given application (e.g., changing a double quotes to a single quote within a message, and the like). Policies related to filtering may define techniques (e.g., via style sheet filters, and the like) to strip away information that is not needed in a service transaction. For instance, if a network is providing a service related to obtaining a credit card, a filtering policy may specify that confidential and/or sensitive information such as the social security number of the service requestor be removed from the service request before transmitting the service request to a company that prints credit cards. Finally, policies related business process management may specify how complicated service requests may be divided into sub-requests. In some embodiments, business process management policies may describe orchestration of discrete services into a composite service.

In a typical multinational firm or federated enterprise that spans many large divisions, there may be multiple distributed information repositories (e.g., enhanced service repositories 317). Each may use a different vendor solution for storing and managing services or integration flows or connections. By including an integrated metadata repository (e.g., enhanced service repository 317), network 300 may have the flexibility to store and manage service or connectivity-related metadata (such as service or operation names, Web Services Description Language (WSDL) or interface details, authentication credentials, authorization credentials, authorization contracts or entitlements (either at the user or system level), triggers for actions such as logging, service level management and throttling, and multi-factor content-based routing, end-point and load balancer details, transformation and orchestration logic or rules, service-bus or segment mapping or other decisioning criteria) across this flexible array of departmental or divisional repositories while still being able to federate into a common repository that can normalize the information via a common application programming interface (API) or file interface specification and translate the enterprise view of the design-time data into run-time flows, routes or policies that can be enforced or executed in real-time as part of the cross-vendor service mediation framework (potentially interfacing to off-premise resources or entities via a virtual private internet connectivity.)

As an example, assume that a multi-division bank stores web service information in each division using division specific repositories (e.g., enhanced service repositories 317). In this example, division A may use a first commercially available repository, division B may use a second commercially available repository, division C may use a home-grown repository, and division D may use a third commercially available repository. All of this service metadata may be integrated/imported using a common repository with a common interface or file format (e.g., a common API). This federated data may drive enterprise level reports showing holistic cross-divisional service interactions. The enterprise metadata may be used to create XML-formatted control files that enable any node of the network (comprising a vast array of diverse vendor tools configured to act as service mediation framework components such as service routers 315 or service gateways 305-313). This implementation may transform what used to be thousands of independent and uncoordinated vendor point solutions into a grid of interconnected and highly integrated common components that respond to centrally managed instructions or policies.

A common set of policies can be described via various tools and ultimately stored in open formats such as a common XML format to describe run-time policy statements. The enterprise repository (e.g., enhanced service repository 317) may manage this combination of enterprise service metadata and enterprise policies to control and manage connectivity, security, failover, route-away, logging, transformation and translation, orchestration and context based decisioning. The run-time context (real-time performance, cost, availability, quality-of-service (QOS), run-time characteristics such as resource usage and availability) may be measured and fedback or made available to any node of the service mediation framework or to the enterprise repository itself to enable situation specific actions (context aware decisions).

Examples of the types of metadata stored in enhanced service repository 317 may include the name of a given service request, the network route that needs to be taken to reach a service provider for each service request, logging information related to the service request, the expected amount of time for getting a response to the service request, and the like. In general, metadata may include any piece of information that defines the interaction between a service requestor and a service provider, determines the route that a service request must take to get to a service provider, and/or authenticates or authorizes a service request. The enhanced service repository 317 may also include a list of common functions for a given service and/or the policies that guide the use of these functions. The enhanced service repository 317 may export a file in a standardized format (e.g., XML) that any element (e.g., server) may process. The exported file may include information that allows the servers within a network to communicate about services via common protocols.

The specific service policy information stored in enhanced service repository 317 may be driven by a variety of factors, including which client device 301 is requesting the service, the type of service that the client device 301 is requesting, the time of day, the content of the service request message, and/or an overriding policy of the bank, among other things.

In certain aspects, the enhanced service repository 317 may define enough policies and metadata to cover all or a vast majority of all of the interaction points within an entity such as an organization. In some embodiments, the enhanced service repository 317 may export the policy information for service requests in a standard way. The data stored in and transmitted by the enhanced service repository 317 and/or the enhanced service DNS server 303 may be in a variety of formats, including XML.

In this way, if an organization (e.g., a financial institution, and the like) adds a new feature that depends on a service to its corporate network 300, the wait time for integrating the new feature to the corporate network 300 may be reduced drastically. Also, if changes are made to existing services, these changes may also be implemented in network 300 much more quickly. Thus, potential delays to market share that depend on this new feature may also likewise be reduced.

Figure 4:
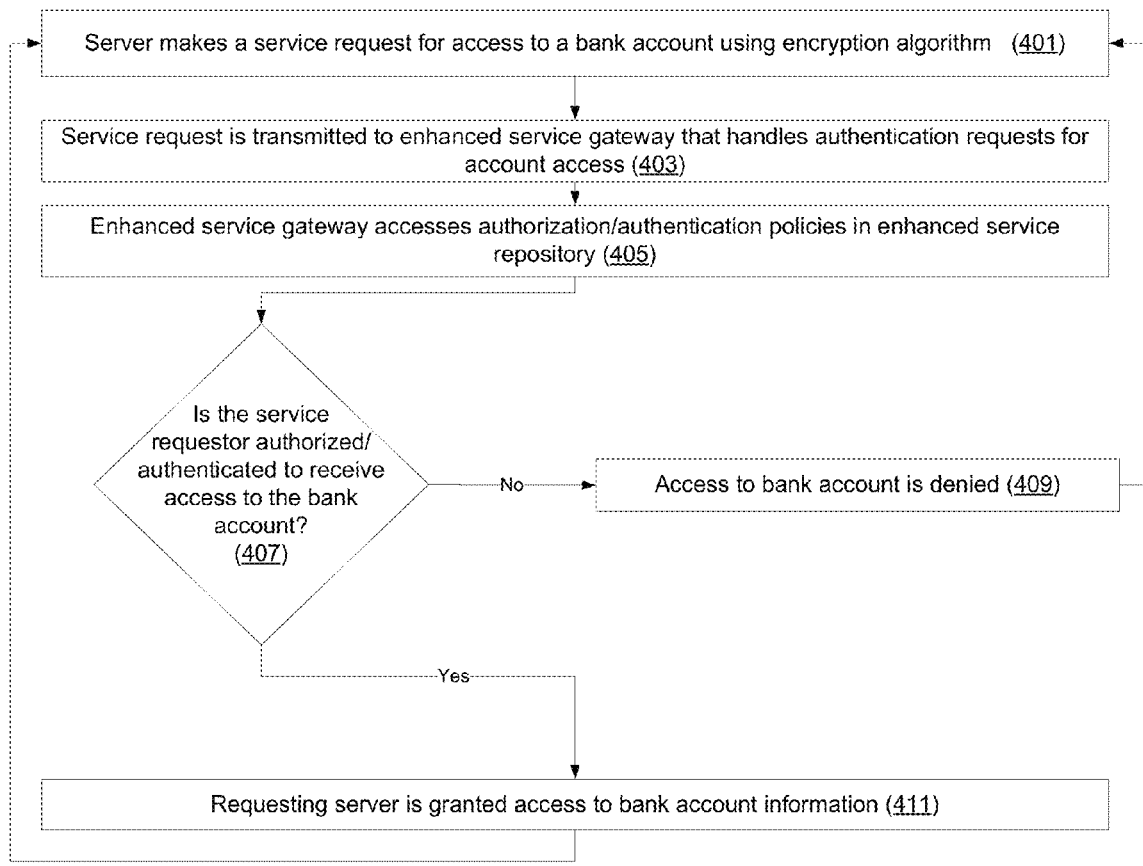
FIG. 4 shows an example method using the service mediation framework in accordance with at least one aspect of the disclosure.

FIG. 4 shows an example method using the service mediation framework, in accordance with certain aspects of the disclosure. The example of FIG. 4 focuses on a service request that involves authorization and authentication of a service request for access to a bank account. The method shown in FIG. 4 may start out at step 401 where a first server (e.g., a client device 301) within the bank may make a first request for access to a bank account using a given message encryption algorithm. The process may then move to step 403 where the service request may be transmitted to an enhanced service gateway (e.g., service gateways 305-313) that handles service requests for access to bank accounts.

Then, in step 405, the appropriate enhanced service gateway 305-313 may then access authentication/authorization policy metadata within enhanced service repository 317 to authenticate and/or authorize the requesting server for access to the bank account. The policies accessed by the enhanced service gateway 305-313 may include verifying the identity credential (e.g., a security token, a cryptographic key, and the like) of the requesting server, entitlement policies for information related to the bank account, and the like.

The process may then move to step 407 where the enhanced service gateway 305-313 may analyze the authentication/authorization service policies retrieved from the enhanced service repository 317 to determine if the service requestor should be given access to information in the bank account.

Assume that in this case one of the policies accessed includes a verification of the encryption algorithm used by the requesting server in the service request for access to the bank account. Assume also that an approved list of encryption algorithms for service requests for accessing bank accounts as stored in enhanced service repository 317 has been recently modified to exclude the type of encryption algorithm used by the requesting server in this case. In this case, the process may then move to step 409 where the enhanced service gateway 305-313 may deny the requesting server access to the bank account based on the use of an unapproved encryption algorithm (e.g., a security risk). The requesting server may then modify the encryption algorithm used to make the service request and resubmit the request in step 401.

Finally, if the requesting server is authorized/authenticated to receive access to information in the bank account, the enhanced service gateway 305-313 may grant the requesting server access to the bank account information in step 411.

An incoming service request may include content which will uniquely identify how to process the transaction. To identify the service mediation implementation, this token may be used to lookup a specific implementation in a shared metadata repository via a specific component, the service repository (both of which may be variations of service repository 317). Information in the service repository may reference the location of a distinct component in the shared metadata repository called the integration specification. The contents of the integration specification may identify all facets of integration between the service consumer and provider and the service mediation framework operates on this set of data for the execution of the mediation.

An example of the dynamic mediation logic captured in the integration specification of the service may be the metadata related to the publication of audit, or logging data. Via the integration specification, the service mediation framework may use bits of data specifically defined for audit to specify an alternative location for auditing as well as the specific data to be sent to the auditing system.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A non-transitory computer-readable storage medium having computer-executable program instructions stored thereon that when executed by a processor, cause the processor to perform:
   (a) receiving, from a client device, a service request associated with a service, wherein the service request is chosen from the group consisting of: opening a bank account, registering for a credit card, and applying for a loan;
   (b) accessing a plurality of policy metadata related to the service request from a metadata repository, wherein the plurality of policy metadata includes entitlement policy metadata, routing policy metadata, and protocol bridging policy metadata;
   (c) analyzing the entitlement policy metadata to determine if the client device has a predetermined identity credential, wherein the entitlement policy metadata specifies the predetermined identity credential;
   (d) when the client device has the predetermined identity credential,
      (i) analyzing the protocol bridging policy metadata to determine how to change information within the service request from a first protocol used by the client device to a second protocol used by a service provider of the service;
      (ii) changing the information within the service request from the first protocol to the second protocol;
      (iii) analyzing the routing policy metadata to determine how to route the service request to the service provider; and
      (iv) based on the analysis of the routing policy metadata, routing the service request to the service provider.

2. The non-transitory computer-readable storage medium of claim 1, wherein the first protocol is Hypertext Transfer Protocol (HTTP) and the second protocol is File Transfer Protocol (FTP).

3. The non-transitory computer-readable storage medium of claim 1, wherein the first protocol is File Transfer Protocol (FTP) and the second protocol is Hypertext Transfer Protocol (HTTP).

4. The non-transitory computer-readable storage medium of claim 1, wherein the first protocol is Simple Mail Transfer Protocol (SMTP) and the second protocol is File Transfer Protocol (FTP).

5. The non-transitory computer-readable storage medium of claim 1, wherein the plurality of policy metadata further include workload management policy metadata that define a number of network components that are needed to respond to the service request.

6. The non-transitory computer-readable storage medium of claim 1, wherein the plurality of policy metadata further include logging policy metadata that define logging of data to measure an amount of time taken to respond to the service request.

7. The non-transitory computer-readable storage medium of claim 1, wherein the plurality of policy metadata further include filtering policy metadata that define when to strip away data that is not needed in a service transaction related to the service request.

8. The non-transitory computer-readable storage medium of claim 7, wherein the processor further performs: stripping away confidential information from the service request after analyzing the filtering policy metadata.

9. The non-transitory computer-readable storage medium of claim 1, wherein the entitlement policy metadata is further analyzed to determine if the service request employs an approved encryption algorithm.

10. A computer-assisted method comprising:
    receiving a service request associated with a service from a client device through a communication module associated with the computer, wherein the service request is chosen from the group consisting of: opening a bank account, registering for a credit card, and applying for a loan;
    requesting access to a plurality of policy metadata related to the service request from a metadata repository through the communication module, wherein the plurality of policy metadata includes entitlement policy metadata, protocol bridging policy metadata, routing policy metadata, logging policy metadata, and workload management policy metadata;
    in response to the request for access to the plurality of policy metadata, receiving an Extensible Markup Language (XML) file with the plurality of policy metadata;
    using a processor associated with the computer, analyzing the entitlement policy metadata in the XML file to determine if the client device is authorized for a privileged resource specified in the service request;
    when the client device is authorized for the privileged resource,
       (i) using the processor, analyzing the logging policy metadata to determine how to log a granting of access to the privileged resource;
       (ii) using the processor, logging the granting of access to the privileged resource;
       (iii) using the processor, analyzing the workload management policy metadata to determine which of a plurality of network components are needed to respond to the service request;
       (iv) using the processor, analyzing the routing policy metadata to determine how to route the service request to a first of the plurality of network components;
       (v) routing the service request to the first of the plurality of network components through the communication module;
       (vi) receiving a first response from the first of the plurality of network components through the communication module;
       (vii) repeating steps (iv)-(vi) for each of the plurality of network components needed to respond to the service request; and (viii) routing a final response from a last of the plurality of network devices to the client device through the communication module.

11. The computer-assisted method of claim 10, wherein the plurality of policy metadata further include filtering policy metadata that define when to strip away data that is not needed in a service transaction related to the service request.

12. The computer-assisted method of claim 11, further comprising: using a style sheet filter stored in a memory of the computer, stripping away confidential information from the service request after analyzing the filtering policy metadata.

13. The computer-assisted method of claim 10, wherein the protocol bridging policy metadata defines how to change information within the service request from a first protocol used by the client device to a second protocol used by a service provider of the service.

14. The computer-assisted method of claim 13, wherein the first protocol is Simple Mail Transfer Protocol (SMTP) and the second protocol is Hypertext Transfer Protocol (HTTP).

15. A system comprising:
   a service repository configured to store a plurality of service policy metadata associated with a plurality of service processing tasks, wherein the plurality of service processing tasks include entitlement, routing, workload management, logging, protocol bridging, format translation, filtering, and business process management, wherein the plurality of service policy metadata are periodically updated when a new service comes online and older service policy information becomes obsolete;
   a service router configured to route a service request from a client device to a predetermined service gateway after accessing the plurality of service policy metadata related to routing, wherein the service request is chosen from the group consisting of: opening a bank account, registering for a credit card, and applying for a loan; and
   the predetermined service gateway configured to process the service request by implementing at least one of the plurality of service processing tasks after accessing a latest version of the plurality of service policy metadata stored within the service repository, wherein the service gateway is configured to communicate with the service router and the service repository through Extensible Markup Language (XML) messages.

16. The system of claim 15, wherein the service gateway comprises a server appliance.

17. The system of claim 16, wherein the server appliance is configured to employ Extensible Stylesheet Language Transformations (XSLT) to communicate with the service router and the service repository.

18. The system of claim 15, further comprising: a service domain name system (DNS) server configured to access the service repository for information related to translating a service uniform resource locator (URL) into a service address.

19. The system of claim 18, wherein the service DNS server is further configured to: communicate with the service router to route the service request to the predetermined service gateway located at the service address.

* * * * *